US006978661B2

(12) United States Patent
Hutchinson et al.

(10) Patent No.: US 6,978,661 B2
(45) Date of Patent: Dec. 27, 2005

(54) SECONDARY CONTAINMENT LEAK PREVENTION AND DETECTION SYSTEM AND METHOD IN FUEL DISPENSER (75) Inventors: Ray J. Hutchinson, Houma, LA (US); Donald D. Halla, Southington, CT (US); Richard G. Dolson, Canton, CT (US); Robert P. Hart, East Hampton, CT (US); Richard K. Lucas, Enfield, CT (US); Kent D. Reid, Canton, CT (US)

(73) Assignee: Gilbarco Inc., Greensboro, NC (US)

( * ) Notice: Subject to any disclaimer, the term of this patent is extended or adjusted under 35 U.S.C. 154(b) by 0 days.

(21) Appl. No.: 10/775,045

(22) Filed: Feb. 9, 2004

(65) Prior Publication Data

US 2004/0261504 A1   Dec. 30, 2004

Related U.S. Application Data

(63) Continuation-in-part of application No. 10/703,156, filed on Nov. 6, 2003, which is a continuation-in-part of application No. 10/430,890, filed on May 6, 2003, which is a continuation-in-part of application No. 10/238,822, filed on Sep. 10, 2002.

(51) Int. Cl.[7] ........................... G01M 3/22; G01M 3/28
(52) U.S. Cl. ..................... 73/49.2; 73/40.5 R; 73/49.5; 340/605; 137/557; 137/559; 141/94; 141/95
(58) Field of Search ............................ 73/40, 49.5 R, 73/49.1, 49.2, 49.5, 40.5 R; 137/312, 557, 137/559; 340/605; 141/94, 95, 96, 98, 311 A (56) References Cited

U.S. PATENT DOCUMENTS 2,821,993 A   2/1958   Pacey et al.
2,941,147 A   6/1960   McKinlay, Jr.
2,947,147 A   8/1960   Johnson
3,183,723 A   5/1965   Deters ..................... 73/40.5 R
3,848,765 A   11/1974  Durkop
3,995,472 A   12/1976  Murray
4,523,454 A   6/1985   Sharp
4,644,780 A   2/1987   Jeter
4,653,312 A   3/1987   Sharp
4,672,366 A   6/1987   Butts (Continued)

FOREIGN PATENT DOCUMENTS

DE   1258678   1/1968

(Continued)

OTHER PUBLICATIONS

Website, "Red Jacket—Quantum," www.redjacket.com/quantum.htm, printed May 27, 2003.

(Continued)

*Primary Examiner*—Daniel S. Larkin
(74) *Attorney, Agent, or Firm*—Withrow & Terranova, PLLC (57) ABSTRACT

A vacuum generator that is coupled to a double-walled fuel supply piping internal to a fuel dispenser that carries the fuel from the underground storage tank to the hose and nozzle of the fuel dispenser. The double-walled fuel supply piping contains an inner piping that carries the fuel. An interstitial space is formed by the space between the inner piping and an outer piping that surrounds the inner piping to capture any leaked fuel from the inner piping. The interstitial space is coupled to a vacuum created by the vacuum generator to determine if a leak exists in the interstitial space. The vacuum generator may be a standalone unit or may be a submersible turbine pump that also pumps fuel from the underground storage tank to the fuel dispenser.

48 Claims, 5 Drawing Sheets

U.S. PATENT DOCUMENTS

| | | |
|---|---|---|
| 4,676,093 A | 6/1987 | Pugnale et al. |
| 4,708,015 A | 11/1987 | Sharp |
| 4,723,441 A | 2/1988 | Sweeney |
| 4,863,710 A | 9/1989 | Rule et al. |
| 4,971,477 A | 11/1990 | Webb et al. |
| 5,018,864 A | 5/1991 | Richert |
| 5,042,290 A | 8/1991 | Geisinger ................ 73/40.5 R |
| 5,072,623 A | 12/1991 | Hendershot ................ 73/49.2 |
| 5,081,864 A | 1/1992 | Zaim |
| 5,115,936 A | 5/1992 | Bartlow |
| 5,117,677 A | 6/1992 | Hendershot et al. |
| 5,135,324 A | 8/1992 | Bravo |
| 5,158,207 A | 10/1992 | Van Daele ................ 222/52 |
| 5,184,504 A | 2/1993 | Spring ................ 73/49.2 |
| 5,263,794 A | 11/1993 | Webb ................ 405/52 |
| 5,297,896 A | 3/1994 | Webb ................ 405/52 |
| 5,343,191 A | 8/1994 | McAtamney |
| 5,398,976 A | 3/1995 | Webb |
| 5,400,646 A | 3/1995 | Kraus et al. ................ 73/49.2 |
| 5,408,420 A | 4/1995 | Slocum et al. |
| 5,440,918 A | 8/1995 | Oster ................ 73/40.5 |
| 5,527,130 A | 6/1996 | Webb ................ 405/52 |
| 5,586,586 A | 12/1996 | Fiech |
| 5,713,607 A | 2/1998 | Webb |
| 5,722,699 A | 3/1998 | Brancher |
| 5,746,454 A | 5/1998 | Webb |
| 5,782,275 A | 7/1998 | Hartsell, Jr. et al. |
| 5,831,149 A | 11/1998 | Webb |
| 5,911,155 A | 6/1999 | Webb ................ 73/40.5 R |
| 5,927,762 A | 7/1999 | Webb |
| 5,955,657 A | 9/1999 | Bravo |
| 5,975,132 A | 11/1999 | Gleeson |
| 6,029,505 A | 2/2000 | Webb ................ 73/40.5 R |
| 6,032,699 A | 3/2000 | Cochran et al. ................ 138/104 |
| 6,067,527 A | 5/2000 | Lovell et al. |
| 6,070,760 A | 6/2000 | Kenney et al. |
| 6,116,815 A | 9/2000 | Chen |
| 6,126,409 A | 10/2000 | Young |
| 6,223,765 B1 | 5/2001 | Small et al. ................ 137/312 |
| 6,489,894 B2 | 12/2002 | Berg |
| 6,523,581 B2 | 2/2003 | Pendleton et al. |
| 2002/0044060 A1 | 4/2002 | Berg |
| 2004/0234338 A1 | 11/2004 | Monroe et al. |

FOREIGN PATENT DOCUMENTS

| | | |
|---|---|---|
| DE | 2900960 | 7/1979 |
| EP | 0931761 A1 | 1/1999 |
| EP | 1179505 A1 | 2/2002 |
| JP | 2000274378 A | 10/2000 |
| WO | WO 86/07446 | 12/1986 |

OTHER PUBLICATIONS

Website, "Veeder-Root—Interstitial Steel Tanks," www.v-eeder-root.com/dynamic/index.cfm?pageID=175, printed May 27, 2003.

SECONDARY CONTAINMENT LEAK PREVENTION AND DETECTION SYSTEM AND METHOD IN FUEL DISPENSER

RELATED APPLICATIONS

This patent application is a continuation-in-part patent application of patent application Ser. No. 10/703,156, filed on Nov. 6, 2003, which is a continuation-in-part application of patent application Ser. No. 10/430,890, filed on May 6, 2003, which is a continuation-in-part of patent application Ser. No. 10/238,822, filed on Sep. 10, 2002, all of which are hereby incorporated by reference in their entireties.

Patent application Ser. No. 10/390,346 entitled "Fuel Storage Tank Leak Prevention and Detection System and Method," filed on Mar. 17, 2003, now U.S. Pat. No. 6,834,534, and including one of the same inventors of the present application, is related to the present application and is also incorporated herein by reference in its entirety.

FIELD OF THE INVENTION

The present invention relates to detection of a leak or breach in the secondary containment of fuel supply piping in a fuel dispenser in a retail service station environment.

BACKGROUND OF THE INVENTION

In service station environments, fuel is delivered to fuel dispensers from underground storage tanks (UST), sometimes referred to as fuel storage tanks. USTs are large containers located beneath the ground that contain fuel. A separate UST is provided for each fuel type, such as low octane gasoline, high octane gasoline, and diesel fuel. In order to deliver the fuel from the USTs to the fuel dispensers, a submersible turbine pump (STP) is provided that pumps the fuel out of the UST and delivers the fuel through a main fuel piping conduit that runs beneath the ground in the service station.

Due to regulatory requirements governing service stations, the main fuel piping conduit is usually required to be double-walled piping. Double-walled piping contains an inner piping that carries the fuel. An outer piping forming an outer annular space, also called an "interstitial space," surrounds the inner piping so as to capture and contain any leaks that occur in the inner piping, so that such leaks do not reach the ground. An example of double-walled fuel pipe is disclosed in U.S. Pat. No. 5,527,130, incorporated herein by reference in its entirety.

It is possible that the outer annular space of the double-walled fuel piping could fail, thereby leaking fuel outside of the fuel piping if the inner piping were to fail as well. Fuel sump sensors that detect leaks are located underneath the ground in the STP sump and the fuel dispenser sumps. These sensors detect any leaks that occur in the fuel piping at the location of the sensors. However, if a leak occurs in the double-walled fuel piping between these sensors, it is possible that a leak in the double-walled fuel piping will go undetected since the leaked fuel will leak into the ground, never reaching one of the fuel leak sensors. The STP will continue to operate as normal, drawing fuel from the UST; however, the fuel may leak to the ground instead of being delivered to the fuel dispensers.

Double-walled fuel piping is located outside of the fuel dispenser beneath the ground in conduits that deliver fuel from the STP to the fuel dispensers. However, once the fuel supply piping enters into the fuel dispenser, the fuel supply piping that is fed to the hydraulic components in the fuel dispenser is not double-walled piping. This internal fuel supply piping inside the fuel dispenser is still capable of incurring a breach thereby leaking fuel to the environment. A fuel dispenser does not contain a sump inside the fuel dispenser to collect leaked fuel and therefore a liquid sensor is not employed to detect leaked fuel. If a breach occurs in the fuel supply piping inside the fuel dispenser, such leak will go undetected since there are no mechanisms to detect or contain such leak.

The aforementioned patent application Ser. No. 10/703,156 and its predecessors discuss leak prevention systems whereby the interstitial space in the double-walled piping is monitored and breaches are detected. The interstitial space is pressure monitored to determine if a breach exists in the outer piping of the double-walled piping. In this manner, a breach in the outer wall is detected regardless of whether a leak has occurred in the inner piping so that an alarm and/or preventive measures can be taken to prevent the leaking of fuel collected in the interstitial space should a breach occur in the inner piping.

Recent proposed changes in state and federal regulations will tighten the requirements to contain leaks and will further require better leak detection so that environmental damage may be minimized. As a result, it is becoming imperative that all potential leak sources be evaluated and steps taken to detect and contain leaks in the piping systems. One area that has not been specifically addressed by the parent disclosures and the prior art is leak prevention of fuel supply piping located inside the fuel dispenser.

SUMMARY OF THE INVENTION

The present invention builds on these teachings by extending the functionality introduced in the parent disclosures. The parent disclosures relate to a sensing unit controller and a tank monitor that monitors the vacuum level in an interstitial space. If the interstitial space cannot maintain a pressure or vacuum level over a given amount of time after being pressurized, this is indicative that the outer wall of the piping or secondary containment contains a breach or leak. If the inner space of the secondary containment were to incur a breach or leak such that fuel reaches the outer annular space, this same fuel would also have the potential to reach the ground through the breach in the outer wall.

The present invention extends the technology disclosed in the parent disclosures to monitoring of the interstitial space in fuel supply piping that is internal to the fuel dispenser that carries fuel to the hose and nozzle of the fuel dispenser. Before the present invention, the monitoring systems of the parent disclosures did not extend to secondary containment through and above the shear valve in the fuel dispenser and in the fuel supply piping internal to the fuel dispenser.

In accordance with the present invention, a sensing unit controller is provided that is communicatively coupled to a tank monitor or other control system. The sensing unit controller is coupled to a pressure sensor coupled to the interstitial space of fuel supply piping internal the fuel dispenser. The fuel supply piping carries fuel from the branch conduit coupled to a main fuel supply conduit coupled to an underground fuel storage tank.

The sensing unit controller controls a vacuum generator to generate a vacuum in the interstitial space. The sensing unit and/or tank monitor determines if there is a leak or breach in the interstitial space by generating a vacuum in the outer annular space. Subsequently, the interstitial space is monitored using the pressure sensor to determine if the vacuum level changes significantly to indicate a leak. The system checks for both catastrophic and precision leaks.

In one leak detection embodiment of the present invention, the vacuum generator is a dedicated vacuum generator coupled to the vacuum tubing. In another embodiment of the present invention, the STP provides the vacuum to the vacuum tubing and the interstitial space of the fuel piping. The tank monitor receives the vacuum level of the interstitial space via the measurements from the pressure sensor and the sensing unit controller. After the vacuum level in the interstitial space reaches a defined initial threshold vacuum level, the vacuum generator is deactivated and isolated from the interstitial space. The vacuum level of the interstitial space is monitored. If the vacuum level decays to a catastrophic threshold vacuum level, the vacuum generator is activated to restore the vacuum level. If the vacuum generator cannot restore the vacuum level to the defined initial threshold vacuum level in a defined amount of time, a catastrophic leak detection alarm is generated and the STP and/or fuel flow control valve in the fuel dispenser is shut down.

If the vacuum level in the interstitial space is restored to the defined initial threshold vacuum level within a defined period of time, a precision leak detection test is performed. The sensing unit controller controls the vacuum level in the interstitial space to determine if the vacuum level decays to a precision threshold vacuum level within a defined period of time, in which case a precision leak detection alarm is generated, and the STP and/or fuel flow control valve may be shut down.

Once a catastrophic leak or precision leak detection alarm is generated, service personnel are typically dispatched to determine if a leak really exists, and if so, to take corrective measures. Tests may be conducted to determine if the leak exists in the vacuum tubing, in the sensing unit controller, or in the interstitial space.

The tank monitor may be communicatively coupled to a site controller and/or remote system to communicate leak detection alarms and other information obtained by the sensing unit. The site controller may pass information from the tank monitor onward to a remote system, and the tank monitor may communicate such information directly to a remote system.

Those skilled in the art will appreciate the scope of the present invention and realize additional aspects thereof after reading the following detailed description of the invention in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
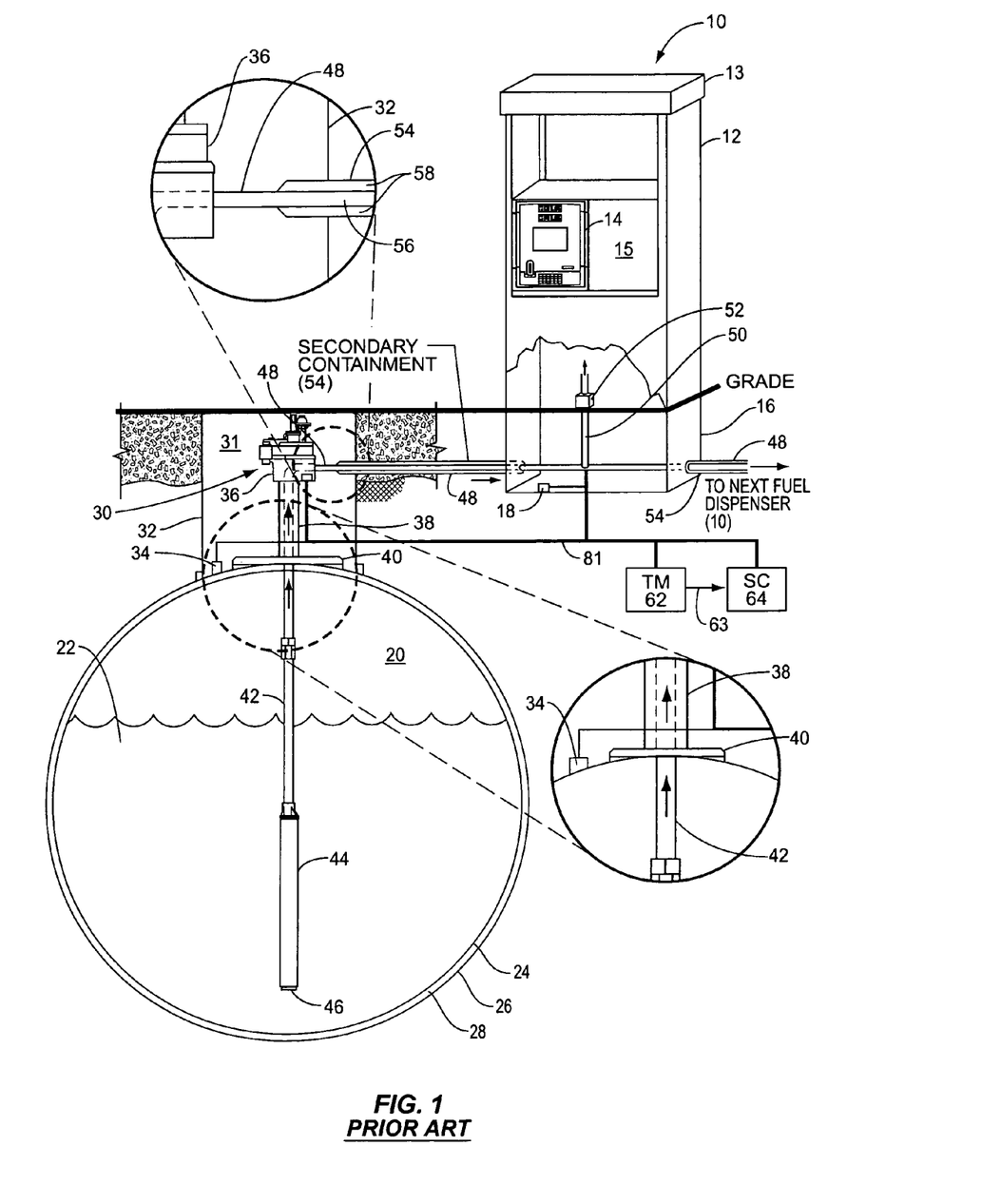
FIG. 1 is an underground storage tank, submersible turbine pump and fuel dispenser system in a service station environment in the prior art.
Figure 2:
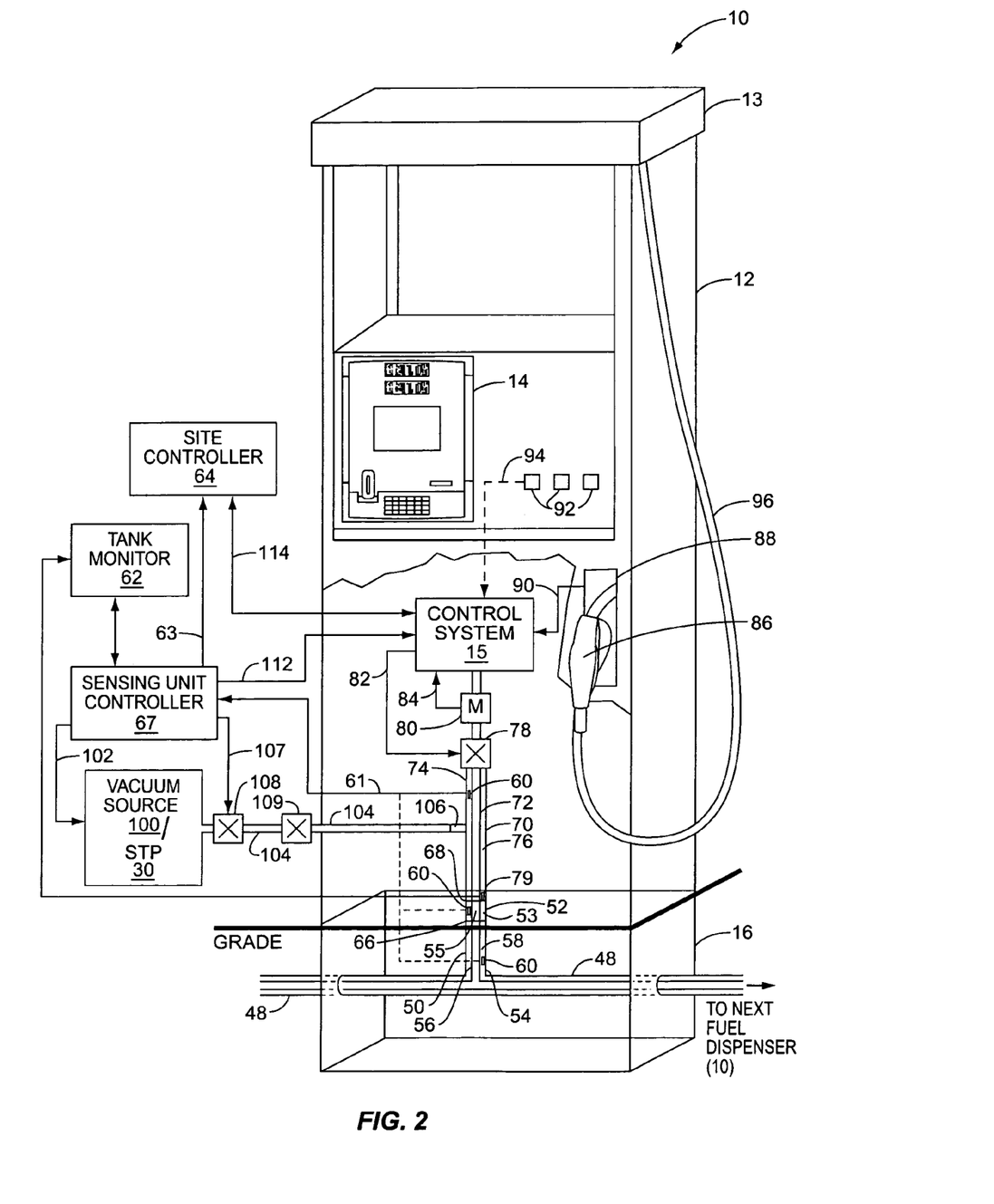
FIG. 2 is a schematic diagram of a fuel dispenser in accordance with the present invention.

Before discussing the particular aspects of the invention starting at FIG. 2 of this application, FIG. 1 illustrates a fuel delivery system known in the prior art for a service station environment. A fuel dispenser 10 is provided that delivers fuel 22 from an underground storage tank (UST) 20 to a vehicle (not shown). The fuel dispenser 10 is comprised of a fuel dispenser housing 12 and a canopy 13. The fuel dispenser 10 typically contains a control system 15 and a display 14. The fuel dispenser 10 contains valves and meters (not shown in FIG. 1) to allow fuel 22 to be received from underground piping and delivered through a hose and nozzle (not shown in FIG. 1). More information on a typical fuel dispenser 10 can be found in U.S. Pat. No. 5,782,275, assigned to same assignee as the present invention, incorporated herein by reference in its entirety.

The fuel 22 that is dispensed by the fuel dispenser 10 is stored beneath the ground in the UST 20. There may be a plurality of USTs 20 in a service station environment if more than one type of fuel 22 is to be delivered by fuel dispensers 10 in the service station. For example, one UST 20 may contain high octane gasoline, another UST 20 may contain low octane gasoline, and yet another UST 20 may contain diesel fuel. The UST 20 is typically a double-walled tank comprised of an inner vessel 24 that holds the fuel 22 surrounded by an outer casing 26. The outer casing 26 provides an added measure of security to prevent leaked fuel 22 from reaching the ground. Any leaked fuel 22 from a leak in the inner vessel 24 will be captured in an annular space 28 that is formed between the inner vessel 24 and the outer casing 26. This annular space is also called an "interstitial space" 28. More information on USTs 20 in service station environments can be found in U.S. Pat. No. 6,116,815, which is incorporated herein by reference in its entirety.

A submersible turbine pump (STP) 30 is provided to draw the fuel 22 from the UST 20 and deliver the fuel 22 to the fuel dispensers 10. An example of a STP 30 is the Quantum™ manufactured and sold by the Marley Pump Company and disclosed at http://www.redjacket.com/quantum-.htm. Another example of a STP 30 is disclosed in U.S. Pat. No. 6,126,409, incorporated hereby by reference in its entirety. The STP 30 is comprised of a STP housing 36 that incorporates a vacuum pump and electronics (not shown). Typically, the vacuum pump is a venturi that is created using a portion of the pressurized fuel product, but the STP 30 is not limited to such an embodiment. The STP 30 is connected to a riser pipe 38 that is mounted using a mount 40 connected to the top of the UST 20. The riser pipe 38 extends down from the STP 30 and out of the STP housing 36. A fuel supply pipe (not shown) is coupled to the STP 30 and is located inside the riser pipe 38. The fuel supply pipe extends down into the UST 20 in the form of a boom 42 that is fluidly coupled to the fuel 22.

The boom 42 is coupled to a turbine housing 44 that contains a turbine, also called a "turbine pump" (not shown), both of which terms can be used interchangeably. The turbine pump is electrically coupled to the STP electronics in the STP 30. When one or more fuel dispensers 10 in the service station are activated to dispense fuel 22, the STP 30 electronics are activated to cause the turbine inside the turbine housing 44 to rotate to pump fuel 22 into the turbine housing inlet 46 and into the boom 42. The fuel 22 is drawn through the fuel supply pipe in the riser pipe 38 and delivered to the main fuel piping conduit 48. The main fuel piping conduit 48 is coupled to the fuel dispensers 10 in the service station whereby the fuel 22 is delivered to a vehicle (not shown). If the main fuel piping conduit 48 is a double-walled piping, the main fuel piping conduit 48 will have an interstitial space 58 as well to capture any leaked fuel.

Regulatory requirements require that any main fuel piping conduit 48 exposed to the ground be contained within a housing or other structure so that any leaked fuel 22 from the main fuel piping conduit 48 is captured. This secondary containment is provided in the form of a double-walled main fuel piping conduit 48, as illustrated in FIG. 1. The double-walled main fuel piping conduit 48 contains an inner space 56 surrounded by an outer annular space 58 formed by outer wall 54, referred to in the figures as "secondary containment" (the outer annular space 58 is sometimes also called herein the "interstitial space" 58). The terms "outer annular space" and "interstitial space" are well known interchangeable terms to one of ordinary skill in the art. The fuel 22 is carried in the inner space 56. In FIG. 1 and in prior art systems, the outer annular space 58 runs through the STP sump wall 32 and terminates to the inner space 56 once inside the STP sump wall 32 via clamping. This is because the STP sump wall 32 provides the secondary containment of the inner space 56 for the portion the main fuel piping conduit 48 inside the STP sump wall 32.

The STP 30 is typically placed inside a STP sump 31 so that any leaks that occur in the STP 30 are contained within the STP sump 31 and are not leaked to the ground. A sump liquid sensor 34 may also be provided inside the STP sump 31 to detect any such leaks so that the STP sump 31 can be periodically serviced to remove any leaked fuel. The sump liquid sensor 34 may be communicatively coupled to a tank monitor 62, site controller 64, or other control system via a communication line 81 so that liquid detected in the STP sump 31 can be communicated to an operator and/or an alarm can be generated. An example of a tank monitor 62 is the TLS-350 manufactured by the Veeder-Root Company. An example of a site controller 64 is the G-Site® manufactured by Gilbarco Inc. Note that any type of monitoring device or other type of controller or control system can be used in place of a tank monitor 62 or site controller 64.

The main fuel piping conduit 48, in the form of a double-walled pipe, is run underneath the ground in a horizontal manner to each of the fuel dispensers 10. Each fuel dispenser 10 is placed on top of a fuel dispenser sump 16 that is located beneath the ground underneath the fuel dispenser 10. The fuel dispenser sump 16 captures any leaked fuel 22 that drains from the fuel dispenser 10 and its internal components so that such fuel 22 is not leaked to the ground. The main fuel piping conduit 48 is run into the fuel dispenser sump 16, and a branch conduit 50 is coupled to the main fuel piping conduit 48 to deliver the fuel 22 into each individual fuel dispenser 10. The branch conduit 50 is typically run into a shear valve 52 located proximate to ground level so that any impact to the fuel dispenser 10 causes the shear valve 52 to engage, thereby shutting off the fuel dispenser 10 access to fuel 22 from the branch conduit 50 for safety purposes. The main fuel piping conduit 48 exits the fuel dispenser sump 16 so that fuel 22 can be delivered to the next fuel dispenser 10, and so on until a final termination is made. A fuel dispenser sump sensor 18 is typically placed in the fuel dispenser sump 16 so that any leaked fuel from the fuel dispenser 10 or the main fuel piping conduit 48 and/or branch conduit 50 that is inside the fuel dispenser sump 16 can be detected and reported accordingly.

FIG. 2 illustrates a fuel delivery system in a service station environment according to one embodiment of the present invention. A fuel dispenser 10 is shown. The main fuel piping conduit 48 is run underneath the ground below the fuel dispenser. The main fuel piping conduit 48 enters into the fuel dispenser sump 16, and a branch conduit 50 is coupled to the main fuel piping conduit 48 to carry fuel 22 to the fuel dispenser 10. The branch conduit 50 is also double-walled piping, as described above, and contains an interstitial space 58 formed by the space between the inner space 56 and the secondary containment 54 or outer piping 54. In the illustrated embodiment, the interstitial space 58 of the branch conduit 50 and the main fuel piping conduit 48 are coupled together so that the interstitial space 58 is maintained continuous between the main fuel supply conduit 48 and the branch conduit 50. The fuel 22 enters the branch conduit 50 and enters into the fuel dispenser 10 for dispensing after a dispensing transaction is initiated by the customer.

In another embodiment of the present invention, the interstitial space 58 of the main fuel supply conduit 48 is not coupled to the interstitial space 58 of the branch conduit 50. Both the main fuel supply conduit 48 and the branch conduit 50 will have secondary containment, but the secondary containment of each piping is not coupled to each other. The reasons for this and the previously discussed embodiment will be explained later in this application.

Before a fueling transaction is initiated, fuel 22 from the branch conduit 50 enters into the fuel dispenser 10. The branch conduit 50 is coupled to the inlet side 66 of the shear valve 52. The fuel 22 runs through the shear valve 52 and exits the shear valve 52 on the outlet side 68 of the shear valve 52. Thereafter, the fuel 22 enters into fuel supply piping 70 internal to the fuel dispenser 10. The fuel supply piping 70 is double-walled piping that is comprised of an inner piping 72 surrounded by an outer piping 74. An interstitial space 76 is formed by the space between the inner piping 72 and the outer piping 74 for secondary containment. Before the present invention, the fuel supply piping 70 did not contain an interstitial space 76 or secondary containment.

One aspect of the present invention, which is not present in the prior art, is that the shear valve 52 and fuel supply piping 70 also have secondary containment. Specifically, the shear valve 52 is coupled to fuel supply piping 70 such that the interstitial space 76 is coupled to an interstitial space 53 surrounding the fuel flow path 55 internal to the shear valve 52, as illustrated. In this manner, the fuel 22 that leaves the UST 20 and enters into the main fuel piping conduit 48 and enters into a fuel dispenser 10 via the branch conduit 50, and travels in the fuel dispenser 10 through the shear valve 52 and the fuel supply piping 70 internal the fuel dispenser contains secondary containment in the event that a leak occurs to the inner piping of these fuel paths and components.

In the embodiment illustrated in FIG. 2, a customer initiates a fueling transaction at the fuel dispenser 10 by lifting the nozzle 86 from the nozzle holder 88. The nozzle 86 is coupled to a hose 96 which is coupled to fuel piping internal to the fuel dispenser to deliver fuel 22 to a vehicle. After the nozzle 86 is lifted from the nozzle holder 88, a signal is generated to the control system 15 inside the fuel dispenser 10 via nozzle handle signal line 90. Thereafter, the control system 15 has knowledge that the customer is attempting to initiate a fueling transaction. The control system 15 may communicate with the site controller 64 via a dispenser communication loop 114 for control and informational purposes, as is well known in the art. The control system 15 then prompts the customer via display 14 to select the particular octane of fuel desired. The customer can choose the octane of fuel desired for dispensing by pressing one of the octane selection buttons 92. Once a customer presses one of the octane selection buttons 92, a signal is communicated to the control system via the octane signal line 94 to indicate which button the customer pressed to the control system 15.

The control system 15 will thereafter cause the appropriate fuel flow control valve 78 to open via the fuel flow control valve signal line 82 to allow fuel from the fuel supply piping 70 to enter into a meter 80 for metering. The meter 80 meters the amount of fuel 22 being dispensed and communicates this information via a pulser signal line 84 input into the control system 15. The control system 15 converts the signals from the pulser signal line 84 into a volume to be displayed on the display 14. The display 14 also displays the amount charged to the customer for fuel 22 dispensed as well. FIG. 2 only shows one fuel flow control valve 78, but it is understood that the fuel dispenser 10 will have a separate fuel flow control valve 78 for each octane of fuel that can be delivered from a UST 20. After the fuel 22 is metered by the meter 80, the fuel 22 is transported via the fuel supply piping 70 downstream of the meter 80 (not illustrated) until it reaches the hose 96 for delivery to the nozzle 86 and into a vehicle fuel tank (not shown).

In accordance with the present invention, a pressure sensor 60 is coupled to the interstitial space 76 of the fuel supply piping 70 so that the pressure of the interstitial space 76 can be monitored for leak detection and prevention in accordance with the present invention. The pressure sensor 60 is electrically coupled to a sensing unit controller 67 via a pressure sensor signal line 61 so that the sensing unit controller 67 has knowledge of the pressure inside the interstitial space 76. The sensing unit controller 67 may be any type of microprocessor, micro-controller, or electronics, and may be contained within the tank monitor 62, the site controller 64, or the control system 15. The sensing unit controller 67 may be coupled to the control system 15 via communication line 112. A vacuum generator 100 is coupled to the interstitial space 76 via a vacuum tubing 104 that is coupled to the interstitial space 76 via a fitting 106. The vacuum generator 100 may be provided by the STP 30, as is discussed in the parent applications to this patent application. A check valve 109 may be placed inline to the vacuum tubing 70 if it is desired to prevent the vacuum generator 100 from ingressing air to the interstitial space 76.

A vacuum control valve 108 is placed inline to the vacuum tubing 104 between the pressure sensor 60 and the vacuum generator 100. The vacuum control valve 108 is electrically coupled to the sensing unit controller 67 via the vacuum control valve signal line 107 and is closed by the sensing unit controller 67 when it is desired to isolate the vacuum generator 100 from the interstitial space 76 during leak detection tests, as will be described in more detail below. The vacuum control valve 108 may be a solenoid-controlled valve or any other type of valve that can be controlled by sensing unit controller 67.

The vacuum generator 100 is used to create a vacuum in the interstitial space 76. The vacuum generator 100 is controlled by the sensing unit controller 67 via vacuum generator control line 102. If the interstitial space 76 cannot maintain a vacuum level over a given period of time after being pressurized, this is indicative that the outer piping 74 contains a breach or leak. In this instance, if the inner piping 72 were to incur a breach or leak such that fuel 22 reaches the interstitial space 76, this same fuel 22 would also have the potential to reach the environment through the breach in the outer piping 74. Therefore, it is desirable to know if the outer piping 74 contains a breach or leak when it occurs and before a leak or breach occurs in the inner piping 72, if possible, so that appropriate notifications, alarms, and measures can be taken in a preventive manner rather than after a leak of fuel 22 to the environment. It is this aspect of the present invention that is described below.

The terms "pressure" and "vacuum level" are used interchangeably herein. One or more pressure sensors 60 may be placed at other locations so long as such location is coupled to the interstitial space 76 of the fuel supply piping 70, including but not limited to the shear valve interstitial space 53 and/or the branch conduit interstitial space 58.

The vacuum generator 100 may be a separate dedicated vacuum generating source or may be a vacuum generated by the STP 30. If the vacuum generated in the interstitial space 76 is generated by the STP 30, one method may be to use a siphon system in the STP 30 to create a vacuum level in the interstitial space 76, such as the siphon system described in U.S. Pat. No. 6,223,765, assigned to Marley Pump Company and incorporated herein by reference in its entirety. Another method is to direct some of the vacuum generated by the STP 30 from inside the boom 42 to the outer annular space 58. The present invention is not limited to any particular method or source of generating a vacuum level in the interstitial space 76.

A liquid detection sensor 79 may also be located in the interstitial space 76 of the fuel supply piping 70 to detect leaks. The liquid detection sensor 79 is coupled to the tank monitor 62, and the tank monitor 62 can generate an alarm and/or cause the sensing unit controller 67 to disable the vacuum generator 100 since a leak has been detected. The liquid detection sensor 79 may be comprised of a float or other liquid detection means. Service personnel can then be alerted to check for leaks in the inner piping 72.

Against this backdrop, the functional operation of these components is better explicated. The parent disclosures teach that the present invention is capable of performing two types of leak detection tests: precision and catastrophic. A catastrophic leak is defined as a major leak where a vacuum level in the interstitial space 76 changes very quickly due to a large leak in the interstitial space 76. A precision leak is defined as a leak where the vacuum level in the interstitial space 76 changes less drastically than a vacuum level change for a catastrophic leak.

Figure 3A:
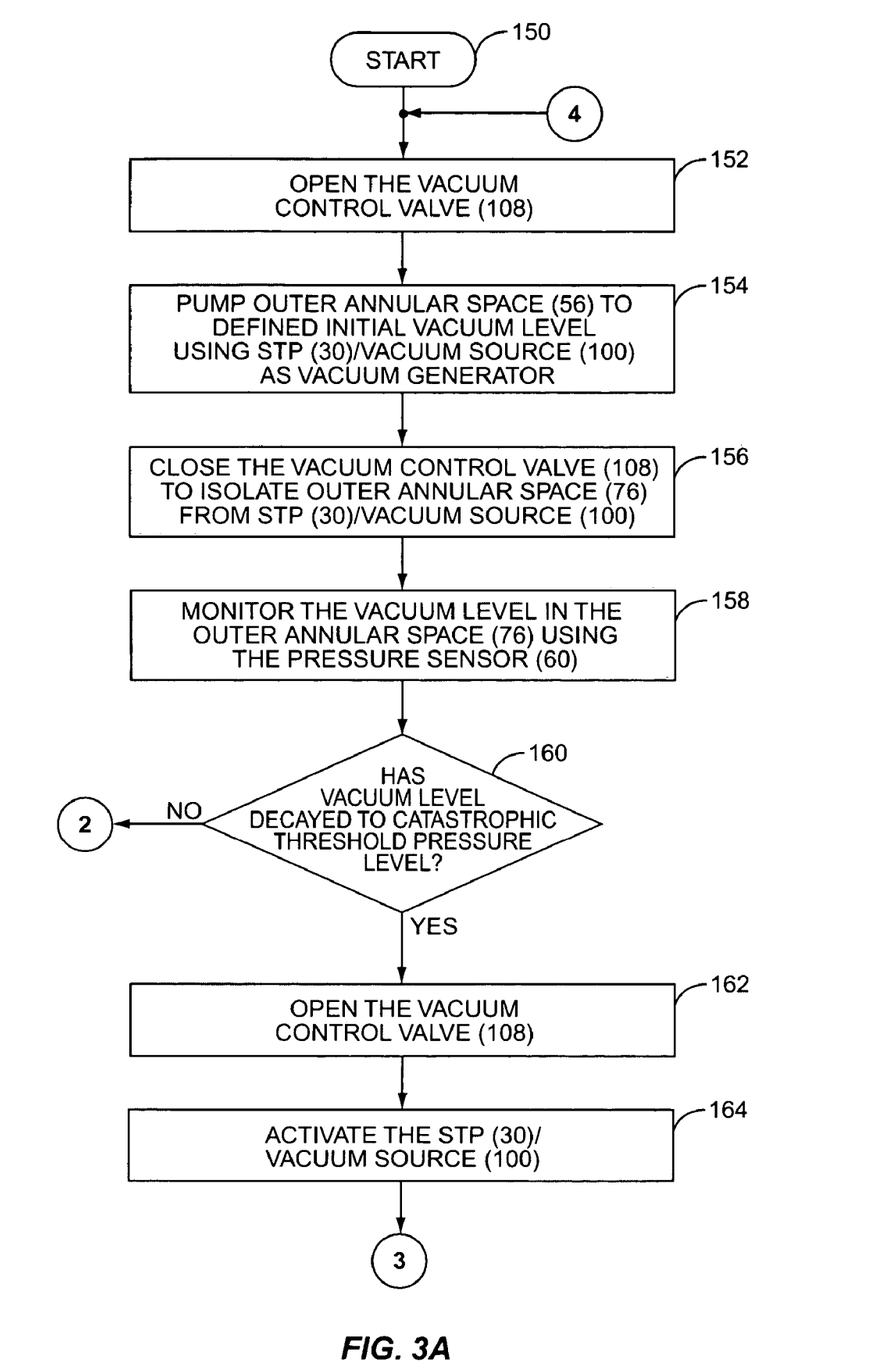
FIGS. 3A and 3B are flowchart diagrams illustrating one embodiment of the leak detection test of the present invention.
Figure 3B:
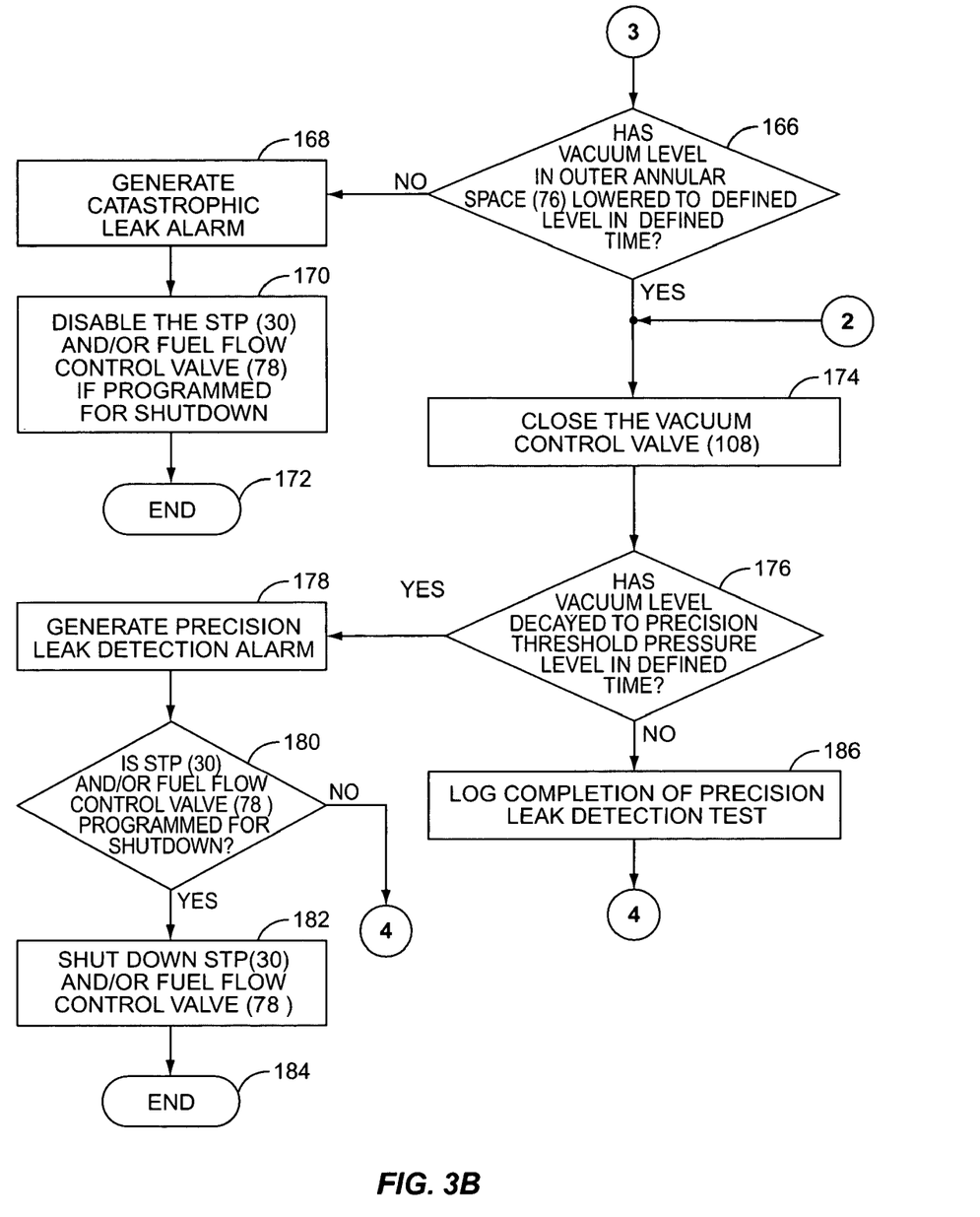

FIGS. 3A and 3B provide a flowchart illustration of the leak detection operation of the sensing unit controller 67 that, according to one embodiment of the present invention, performs both the catastrophic and precision leak detection tests for the outer piping 74 of the fuel supply piping 70. The tank monitor 62 directs the sensing unit controller 67 to begin a leak detection test to start the process (step 150). Alternatively, a test may be started automatically by the sensing unit controller 67 if the vacuum level in the interstitial space 76 reaches a predefined threshold. In response, the sensing unit controller 67 opens the vacuum control valve 108 (step 152) so that the vacuum generator 100/STP 30 is coupled to the interstitial space 76 via the vacuum tubing 104. The vacuum generator 100/STP 30 provides a vacuum and pumps the air, gas, and/or liquid out of the vacuum tubing 104 and the interstitial space 76, via its coupling to the vacuum tubing 104. The vacuum generator 100/STP 30 pumps the air, gas or liquid out of the interstitial space 76 until a defined initial threshold vacuum level is reached or substantially reached (step 154). The tank monitor 62 receives the vacuum level of the interstitial space 76 via the measurements from the pressure sensor 60 communication to the sensing unit controller 67. This defined initial threshold vacuum level is −15 inches of Hg in one embodiment of the present invention, and may be a programmable vacuum level in the tank monitor 62. Also, note that if the vacuum level in the interstitial space 76 is already at the defined initial threshold vacuum level or substantially close to the defined initial vacuum threshold level sufficient to perform the leak detection test, steps 152 and 154 may be skipped.

After the vacuum level in the vacuum tubing 104 reaches the defined initial threshold vacuum level, as ascertained by monitoring of the pressure sensor 60, the tank monitor 62 directs the sensing unit controller 67 to deactivate the vacuum generator 100/STP 30 (unless the vacuum generator 100/STP 30 has been turned on for fuel dispensing) and to close the vacuum control valve 108 to isolate the interstitial space 76 from the vacuum generator 100/STP 30 (step 156). Next, the tank monitor 62 monitors the vacuum level using vacuum level readings from the pressure sensor 60 via the sensing unit controller 67 (step 158). If the vacuum level decays to a catastrophic threshold vacuum level, which may be −10 inches of Hg in one embodiment of the present invention and also may be programmable in the tank monitor 62, this is an indication that a catastrophic leak may exist (decision 160). If yes, the sensing unit controller 67 opens the vacuum control valve 108 (step 162) and activates the vacuum generator 100/STP 30 (unless the STP 30 is already turned on for fuel dispensing in the case of the STP 30 generating the vacuum) to attempt to restore the vacuum level back to the defined initial threshold vacuum level (−15 inches of Hg in the specific example) (step 164).

Continuing to FIG. 3B, the tank monitor 62 determines if the vacuum level in the interstitial space 76 has lowered back down to the defined initial threshold vacuum level (−15 inches of Hg in the specific example) within a defined period of time, which is programmable in the tank monitor 62 (decision 166). If not, this is an indication that a major leak exists in the outer piping 74 of the fuel supply piping 70 or the vacuum tubing 104, and the tank monitor 62 generates a catastrophic leak detection alarm (step 168). The tank monitor 62, if so programmed, will shut down the STP 30 and/or fuel flow control valve 78 so that the STP 30 does not pump fuel 22 to fuel dispensers 10 that may leak due to the breach in the outer piping 74 and the fuel flow control valve 78 prevents leaked fuel from being dispensed by the nozzle 86 (step 170), and the process ends (step 172). An operator or service personnel can then manually check the integrity of the interstitial space 76, vacuum tubing 104 and/or conduct additional leak detection tests on-site, as desired, before allowing the STP 30 and fuel dispenser 10 to be operational again. If the vacuum level in the interstitial space 76 does lower back down to the defined initial threshold vacuum level within the defined period of time (decision 166), no leak detection alarm is generated at this point in the process.

Back in decision 160 (shown in FIG. 3A), if the vacuum level did not decay to the defined initial threshold vacuum level (−15 inches of Hg in specific example), this is also an indication that a catastrophic leak does not exist. Either way, if the answer to decision 160 is no, or the answer to decision 166 is yes, the tank monitor 62 goes on to perform a precision leak detection test since no catastrophic leak exists.

For the precision leak detection test, the tank monitor 62 directs the sensing unit controller 67 to close the vacuum control valve 108 if it is not already closed (step 174). Next, the tank monitor 62 determines if the vacuum level in the interstitial space 76 has decayed to a precision threshold vacuum level within a defined period of time, both of which may be programmable (decision 176). If not, the tank monitor 62 logs the precision leak detection test as completed with no alarm (step 186), and the leak detection process restarts again as programmed by the tank monitor 62 (step 150).

If the vacuum level in the interstitial space 76 has decayed to a precision threshold vacuum level within the defined period of time, the tank monitor 62 generates a precision leak detection alarm (step 178). The tank monitor 62 determines if the tank monitor 62 has been programmed to shut down the STP 30 and/or fuel flow control valve 78 in the event of a precision leak detection alarm (decision 180). If yes, the tank monitor 62 shuts down the STP 30 and/or fuel flow control valve 78, and the process ends (step 184). If not, the STP 30 can continue to operate when fuel dispensers are activated, and the leak detection process restarts again as programmed by the tank monitor 62 (step 150). This is because it may be acceptable to allow the STP 30 to continue to operate if a precision leak detection alarm occurs depending on regulations and procedures. Also, note that both the precision threshold vacuum level and the defined period of time may be programmable at the tank monitor 62 according to levels that are desired to be indicative of a precision leak.

Once a catastrophic leak or precision leak detection alarm is generated, service personnel are typically dispatched to determine if a leak really exists, and if so, to take corrective measures. The service personnel can close the vacuum control valve 108 between the sensing unit controller 67 and the interstitial space 76 to isolate the two from each other. The service personnel can then initiate leak tests manually from the tank monitor 62 that operate as illustrated in FIGS. 3A and 3B. If the leak detection tests pass after previously failing and after the vacuum control valve 108 is closed, this is indicative that some area of the interstitial space 76 contains the leak. If the leak detection tests continue to fail, this is indicative that the leak may be present in the vacuum tubing 104 connecting the sensing unit controller 67 to the interstitial space 76, or within the vacuum tubing 104 in the sensing unit controller 67 or the vacuum tubing 104 between sensing unit controller 67 and the vacuum generator 100/STP 30. Closing of the vacuum control valve 108 also allows components of the sensing unit controller 67 and vacuum tubing 104 to be replaced without relieving the vacuum in the interstitial space 76 since it is not desired to recharge the system vacuum and possibly introduce vapors or liquid into the interstitial space 76 as the outer annular space 58 is under a vacuum and will draw in air or liquid if vented.

Figure 4:
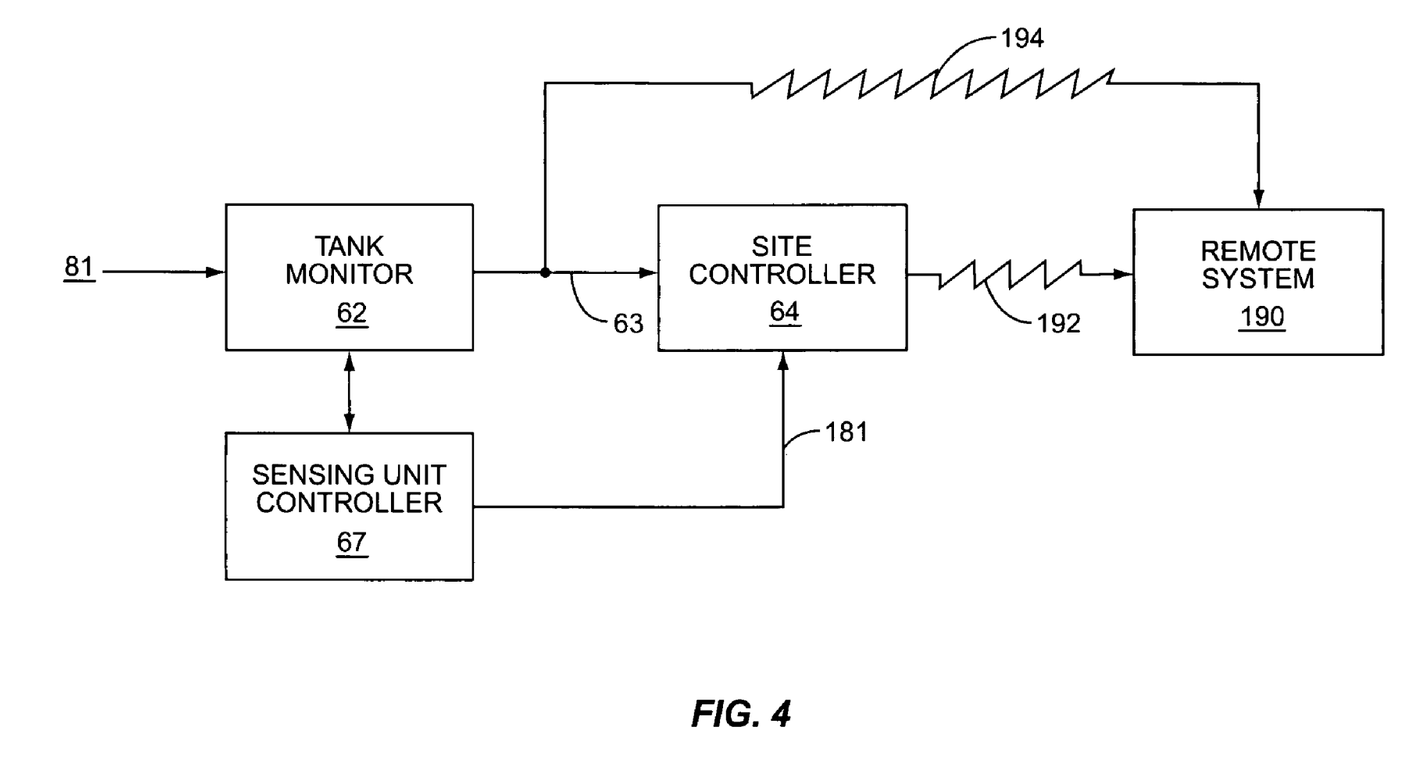
FIG. 4 is a schematic diagram of a communication architecture.

FIG. 4 illustrates a communication system whereby leak detection alarms and other information obtained by the tank monitor 62 and/or the sensing unit controller 67 may be communicated to other systems if desired. This information, such as leak detection alarms for example, may be desired to be communicated to other systems as part of a reporting and dispatching process to alert service personnel or other systems as to a possible breach or leak in the outer piping 74 of the fuel supply piping 70.

The tank monitor 62 that is communicatively coupled to the sensing unit controller 67, and other components of the present invention, may be communicatively coupled to the site controller 64 via a communication line 63. The communication line 63 may be any type of electronic communication connection, including a direct wire connection, or a network connection, such as a local area network (LAN) or other bus communication. The tank monitor 62 may communicate leak detection alarms, vacuum level/pressure level information and other information from the sensing unit controller 67 to the site controller 64. Alternatively, the sensing unit controller 67 may communicate this with the site controller 64 directly via the communication line 181. The site controller 64 may be further communicatively coupled to a remote system 190 to communicate this same information to the remote system 190 from the tank monitor 62 and the site controller 64 via a remote communication line 192. The remote communication line 192 may be any type of electronic communication connection, such as a PSTN, or network connection such as the Internet, for example. The tank monitor 62 may also be directly connected to the remote system 190 using a remote communication line 194 rather than communication through the site controller 64.

Note that any type of controller, control system 15, sensing unit controller 67, site controller 64 and remote system 190 may be used interchangeably with the tank monitor 62 as described in this application and the claims of this application.

The various embodiments presented herein allow for double-walled containment to be positioned in virtually every location within the fueling environment. Further, the present invention teaches a method of leak detection for each of these situations so as to avoid contaminating the environment with leaking fuel.

Those skilled in the art will recognize improvements and modifications to the preferred embodiments of the present invention. All such improvements and modifications are considered within the scope of the concepts disclosed herein and the claims that follow.

What is claimed is:

1. A fuel dispensing system that receives fuel pumped by a submersible turbine pump from an underground storage tank to dispense to a vehicle, comprising:
   a fuel dispenser, comprising:
      a housing;
      a hose;
      a nozzle coupled to said hose;
      a double-walled fuel supply piping having an inner piping and an outer piping located around said inner piping forming an interstitial space between said inner piping and said outer piping, wherein said double-walled fuel supply piping is fluidly coupled to said submersible turbine pump and is located internal to said housing and carries the fuel to said hose for dispensing; and
      a pressure sensor coupled to said interstitial space to detect a vacuum level in said interstitial space;
   a vacuum generator coupled to said interstitial space; and
   a controller that is coupled to said vacuum generator to cause said vacuum generator to generate a vacuum in said interstitial space wherein said controller is coupled to said pressure sensor to determine the vacuum level in said interstitial space.

2. The system of claim 1, wherein said controller generates a catastrophic leak detection alarm if said vacuum generator cannot create a defined initial threshold vacuum level in said interstitial space.

3. The system of claim 1, wherein said controller determines if the vacuum level in said interstitial space has decayed to a catastrophic threshold vacuum level from a defined initial threshold vacuum level.

4. The system of claim 3, wherein said controller activates said vacuum generator to attempt to lower the vacuum level in said interstitial space back down to said defined initial threshold vacuum level if the vacuum level in said interstitial space decays to said catastrophic threshold vacuum level.

5. The system of claim 4, wherein said controller determines if the vacuum level in said interstitial space lowers to said defined initial threshold vacuum level within a defined amount of time.

6. The system of claim 5, wherein said controller generates a catastrophic leak detection alarm if said controller determines that the vacuum level in said interstitial space does not lower to said defined initial threshold vacuum level within said defined amount of time.

7. The system of claim 1, wherein said controller determines if a leak exists in said double-walled fuel supply piping by determining if the vacuum level in said interstitial space decays to a threshold vacuum level in a predetermined amount of time.

8. The system of claim 7, wherein said threshold vacuum level is a precision threshold vacuum level.

9. The system of claim 1, further comprising a liquid detection sensor that is coupled to said interstitial space, wherein said liquid detection sensor is coupled to said controller and wherein said liquid detection sensor detects if liquid is present in said interstitial space.

10. The system of claim 9, wherein said controller generates a leak detection alarm when liquid detection is communicated from said liquid detection sensor.

11. The system of claim 9, wherein said controller disables said vacuum generator when said liquid detection is communicated from said liquid detection sensor.

12. The system of claim 9, wherein said liquid detection sensor comprises a float.

13. The system of claim 1, further comprising vacuum tubing that couples said vacuum generator to said interstitial space.

14. The system of claim 13, further comprising a vacuum control valve that is coupled inline to said vacuum tubing between said vacuum generator and said interstitial space wherein said vacuum control valve is electrically coupled to and under control of said controller.

15. The system of claim 14, wherein said controller closes said vacuum control valve before monitoring the vacuum level in said interstitial space to determine if a leak exists in said double-walled fuel supply piping so that said vacuum generator is isolated from said interstitial space.

16. The system of claim 13, wherein said vacuum tubing is connected to said interstitial space through a fitting.

17. The system of claim 13, wherein said vacuum tubing is connected to said interstitial space through said outer piping.

18. The system of claim 1, wherein said controller detects a leak in said double-walled fuel supply piping if the vacuum level in said interstitial space changes after said vacuum generator creates a vacuum in said interstitial space.

19. The system of claim 18, further comprising a fuel flow control valve coupled to said double-walled fuel supply piping downstream from said pressure sensor wherein said controller directs said fuel flow control valve to close if said controller detects a leak.

20. The system of claim 18, further comprising a shear valve coupled to said double-walled fuel supply piping upstream wherein said controller directs said shear valve to close if said controller detects a leak.

21. The system of claim 1, further comprising a shear valve having an inlet side and an outlet side wherein said outlet side is coupled to said double-walled fuel supply piping and said inlet side is coupled to a main fuel supply conduit having an interstitial space that delivers fuel from said submersible turbine pump to said double-walled fuel supply piping wherein said interstitial space of said main fuel supply conduit is coupled to said interstitial space of said double-walled fuel supply piping.

22. The system of claim 21, wherein said vacuum generator is said submersible turbine pump that generates a vacuum through said interstitial space of said double-walled fuel supply piping via said vacuum generated in said interstitial space of said main fuel supply conduit by said submersible turbine pump.

23. The system of claim 21, wherein said shear valve includes an interstitial space that is coupled to said interstitial space of said double-walled fuel supply piping and said interstitial space of said main fuel supply conduit.

24. The system of claim 1, wherein said vacuum generator is said submersible turbine pump.

25. A method for detecting a leak in a double-walled fuel supply piping internal to a fuel dispenser having an interstitial space, comprising:
creating a vacuum level in the interstitial space of the double-walled fuel supply piping internal to the fuel dispenser using a vacuum generator;
sensing the vacuum level in the interstitial space using a pressure sensor; and
monitoring the vacuum level in said interstitial space to determine if a leak exists in the double-walled fuel supply piping.

26. The method of claim 25, further comprising coupling said vacuum generator to said interstitial space using vacuum tubing.

27. The method of claim 26, wherein said step of coupling vacuum generator to the interstitial space using vacuum tubing comprises coupling the vacuum tubing to said interstitial space through an outer wall of said double-walled fuel supply piping.

28. The method of claim 26, wherein said step of coupling vacuum generator to said interstitial space using vacuum tubing comprises coupling said vacuum tubing to said interstitial space through a fitting associated with said double-walled fuel supply piping.

29. The method of claim 26, further comprising closing a fuel flow control valve in said vacuum tubing if a leak is detected in said double-walled fuel supply piping.

30. The method of claim 25 wherein the step of sensing the vacuum level in said interstitial space using a pressure sensor comprises sensing the vacuum level with said pressure sensor positioned in said interstitial space.

31. The method of claim 25, further comprising the step of sensing whether liquid is present in the interstitial space using a liquid detection sensor.

32. The method of claim 31, further comprising generating a liquid leak detection alarm if said liquid detection sensor senses liquid in said interstitial space.

33. The method of claim 31, further comprising disabling said vacuum generator if said liquid detection sensor senses liquid in said interstitial space.

34. The method of claim 25, further comprising closing a vacuum control valve to isolate said vacuum generator from said interstitial space before performing said step of monitoring the vacuum level in said interstitial space.

35. The method of claim 34, further comprising verifying a leak in said interstitial space by closing said vacuum control valve that isolates said interstitial space from said vacuum generator.

36. The method of claim 25, further comprising preventing ingress from said interstitial space to said vacuum generator.

37. The method of claim 25, further comprising determining if said vacuum generator is drawing a sufficient vacuum level in said interstitial space.

38. The method of claim 37, further comprising generating an alarm if said vacuum generator is not drawing said sufficient vacuum level in said interstitial space.

39. The method of claim 25, further comprising generating a catastrophic leak detection alarm if said vacuum generator cannot create a defined initial threshold vacuum level in said interstitial space.

40. The method of claim 39, further comprising determining if the vacuum level in said interstitial space has decayed to a catastrophic threshold vacuum level from said defined initial threshold vacuum level.

41. The method of claim 40, further comprising activating said vacuum generator to attempt to lower the vacuum level in said interstitial space back down to said defined initial threshold vacuum level if the vacuum level in said interstitial space decays to said catastrophic threshold vacuum level.

42. The method of claim 41, further comprising determining if the vacuum level in said interstitial space lowers to said defined initial threshold vacuum level within a defined amount of time.

43. The method of claim 42, further comprising generating a catastrophic leak detection alarm if the vacuum level in said interstitial space does not lower to said defined initial threshold vacuum level within said defined amount of time.

44. The method of claim 25, further comprising determining if a leak exists in said double-walled fuel supply piping by determining if the vacuum level in said interstitial space decays to a threshold vacuum level in a predetermined amount of time.

45. The method of claim 44, wherein said threshold vacuum level is a precision threshold vacuum level.

46. The method of claim 25, further comprising detecting a leak in said double-walled fuel supply piping if the vacuum level in said interstitial space changes after said vacuum generator creates a vacuum in said interstitial space.

47. The method of claim 25, further comprising closing a shear valve coupled to said double-walled fuel supply piping if a leak is detected in said double-walled fuel supply piping.

48. The method of claim 25, wherein said step of creating a vacuum level in the interstitial space of the double-walled fuel supply piping internal to the fuel dispenser is performed using a submersible turbine pump.

* * * * *